US006769526B2

(12) United States Patent
Iida et al.

(10) Patent No.: US 6,769,526 B2
(45) Date of Patent: Aug. 3, 2004

(54) APPARATUS FOR ESTIMATING CLUTCH TEMPERATURE

(75) Inventors: Norio Iida, Kanagawa-ken (JP); Yoshiyuki Fukuda, Kanagawa-ken (JP); Hirotaka Kusukawa, Tokyo (JP); Atsuhiko Gotou, Kanagawa-ken (JP); Shigeo Murata, Kanagawa-ken (JP); Satoshi Mizuya, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/311,595

(22) PCT Filed: Aug. 23, 2001

(86) PCT No.: PCT/JP01/07220

§ 371 (c)(1), (2), (4) Date: Dec. 18, 2002

(87) PCT Pub. No.: WO02/25133

PCT Pub. Date: Mar. 28, 2002

(65) Prior Publication Data

US 2003/0150685 A1 Aug. 14, 2003

(30) Foreign Application Priority Data

Sep. 19, 2000 (JP) ........................................ 2000-282896
Jan. 30, 2001 (JP) ........................................ 2001-021320
Jan. 30, 2001 (JP) ........................................ 2001-021321

(51) Int. Cl.[7] ........................................ F16D 48/06
(52) U.S. Cl. ........................................ 192/82 T; 477/76
(58) Field of Search .......................... 192/82 T; 477/76, 477/98

(56) References Cited

U.S. PATENT DOCUMENTS

| | | | | |
|---|---|---|---|---|
| 4,576,263 A | * | 3/1986 | Lane et al. | 477/72 |
| 5,823,912 A | | 10/1998 | Fischer et al. | |
| 5,960,669 A | * | 10/1999 | Ohashi et al. | 74/335 |
| 6,095,946 A | | 8/2000 | Maguire et al. | |
| 6,152,275 A | | 11/2000 | Fischer et al. | |
| 6,645,121 B2 | * | 11/2003 | Wu et al. | 477/98 |

FOREIGN PATENT DOCUMENTS

| | | | | |
|---|---|---|---|---|
| DE | 196 02 006 A1 | | 8/1996 | |
| JP | 2-195026 A | | 8/1990 | |
| JP | 4-103433 A | | 4/1992 | |
| JP | 7-71492 A | | 3/1995 | |
| JP | 08093794 A | * | 4/1996 | F16D/25/063 |
| JP | 9-250569 A | | 9/1997 | |
| JP | 11-287257 A | | 10/1999 | |

* cited by examiner

*Primary Examiner*—Richard M. Lorence
(74) *Attorney, Agent, or Firm*—Foley & Lardner LLP

(57) ABSTRACT

The present invention provides an apparatus for estimating clutch temperature estimates clutch temperatures that closely follow actual clutch temperature without a temperature sensor and at low cost. The apparatus employs method for calculating energy applied to the driving clutch according to the detected rotational speed difference and estimated torque and method for estimating a clutch temperature variation based on the calculated energy and estimating a clutch temperature based on the estimated clutch temperature variation.

13 Claims, 12 Drawing Sheets

(a)

(b)

DT2 : HIGH-LOAD TEMPERATURE DOMAIN
DT1 : PRACTICAL DRIVING TEMPERATURE DOMAIN
(Kdn1)
(Kdn2)
(Kup2)
(Kup1)
ACTUAL CLUTCH TEMPERATURE
ESTIMATED CLUTCH TEMPERATURE
TIME
TEMPERATURE

NUMERALS IN [ ] ARE DETECTED WHEEL SPEEDS

ESTIMATED CLUTCH TEMPERATURE
OF 3RD EMBODIMENT (T1n ≧ Tc)
3RD EMBODIMENT
(T1n < Tc)
1ST
EMBODIMENT
2WD
CLUTCH LIMIT
TEMPERATURE Tc
CLUTCH PROTECTION
TEMPERATURE Tp
AUTOMATIC MODE
TEMPERATURE TA
INITIAL
TEMPERATURE T0
AUTO
LOCK
2WD
LOCK
AUTO
AUTO
TIME
t0
t1
t2
t3
t4
t5
t6
t7

APPARATUS FOR ESTIMATING CLUTCH TEMPERATURE

TECHNICAL FIELD

The present invention relates to a technique of estimating the temperature of a driving clutch such as a torque distribution clutch in a four-wheel-drive vehicle or a differential limiting clutch between right and left driving wheels.

BACKGROUND ART

A four-wheel-drive vehicle employs, for example, an electronic control clutch for controlling torque distribution between driving wheels and driven wheels. If the torque transmitted through the clutch is large and continues for a long time, the clutch will overheat. To cope with the overheating problem, there is a technique of switching normal clutch control to protective clutch control to disengage the clutch and lower the clutch temperature. A small, light-weight four-wheel drive system installed in, for example, a sport utility vehicle (SUV) must frequently use a clutch to transmit maximum torque when driving a low-frictional road such as a sandy or snowy road. In this case, the protective clutch control must be employed to control the temperature of the clutch.

The protective clutch control needs a clutch temperature as data. The clutch temperature is provided by, for example, a temperature sensor attached to the clutch, or is estimated from torque.

DISCLOSURE OF INVENTION

The protective clutch control that obtains a clutch temperature from a temperature sensor must install the temperature sensor on a clutch such as an electronic control clutch. The temperature sensor must withstand severe heat and vibration under which the clutch operates. In addition, the temperature sensor must be protected from breaks or short circuits. These necessities increase the cost of the protective clutch control.

The protective clutch control that estimates a clutch temperature from torque also has problems mentioned below. The protective clutch control is activated when torque of predetermined magnitude continues for a predetermined period. In FIG. 1A, a torque curve I continuously exceeds a threshold value for a period from t0 to t2 that is longer than a criterial period. The torque curve I is small in magnitude, and therefore, generates no heat that exceeds a clutch protection temperature, as shown in FIG. 1B. Accordingly, the torque curve I needs no protective clutch control. However, the protective clutch control starts at t2 when the torque curve I exceeding the threshold value passes the criterial period. This is excessive protection, and therefore the clutch transmits insufficient torque.

A torque curve II of FIG. 1A also exceeds the threshold value for the period from t0 to t2, and therefore, the protective clutch control also starts at t2. The torque curve II is large in magnitude, and therefore, generates beat that exceeds the clutch protection temperature at t1 before t2, as shown in FIG. 1B. This is insufficient protection, i.e., the clutch protection is too late to start.

FIG. 2 shows protective clutch control based on a prior art that resets an estimated clutch temperature whenever an instructed torque value to a clutch falls below a threshold value, although the temperature of the clutch decreases slowly. When the instructed torque alternately rises above and falls below the threshold value, an estimated clutch temperature greatly deviates from an actual clutch temperature because of the slowness of clutch temperature decrease. This deteriorates the reliability of estimated clutch temperatures.

An object of the present invention is to solve these problems by providing an apparatus for estimating clutch temperatures that closely follow actual clutch temperatures. The apparatus employs no temperature sensor, and therefore, is low-cost.

In order to accomplish the object, a first aspect of the present invention provides an apparatus for estimating the temperature of a driving clutch whose engagement including slide engagement is controllable. The apparatus has a clutch speed difference detector that detects a rotational speed difference between input and output shafts of the driving clutch, a torque estimator that estimates torque transmitted through the driving clutch, an energy calculator that calculates energy applied to the driving clutch according to the detected rotational speed difference and estimated torque, a temperature estimator that estimates a clutch temperature variation based on the calculated energy and estimates a clutch temperature based on the estimated clutch temperature variation, and a determination unit that determines whether or not the calculated energy is above a reference energy level. If the calculated energy is determined to be equal to or above the reference energy level, the temperature estimator increases the estimated clutch temperature by an increment, and if the calculated energy is determined to be below the reference energy level, the temperature estimator decreases the estimated clutch temperature by a decrement.

A second aspect of the present invention provides a method of estimating the temperature of a driving clutch whose engagement including slide engagement is controllable. The method includes an operation of detecting a rotational speed difference between input and output shafts of the driving clutch, an operation of estimating torque transmitted through the driving clutch, an operation of calculating energy applied to the driving clutch according to the detected rotational speed difference and estimated torque, an operation of estimating a clutch temperature variation based on the calculated energy and estimating a clutch temperature based on the estimated clutch temperature variation, and an operation of determining whether or not the calculated energy is above a reference energy level. If the calculated energy is determined to be equal to or above the reference energy level, the clutch temperature estimating operation increases the estimated clutch temperature by an increment, and if the calculated energy is determined to be below the reference energy level, the clutch temperature estimating operation decreases the estimated clutch temperature by a decrement.

BEST MODE FOR CARRYING OUT THE INVENTION

Various embodiments of the present invention will be described with reference to the accompanying drawings.

First Embodiment

Figure 3:
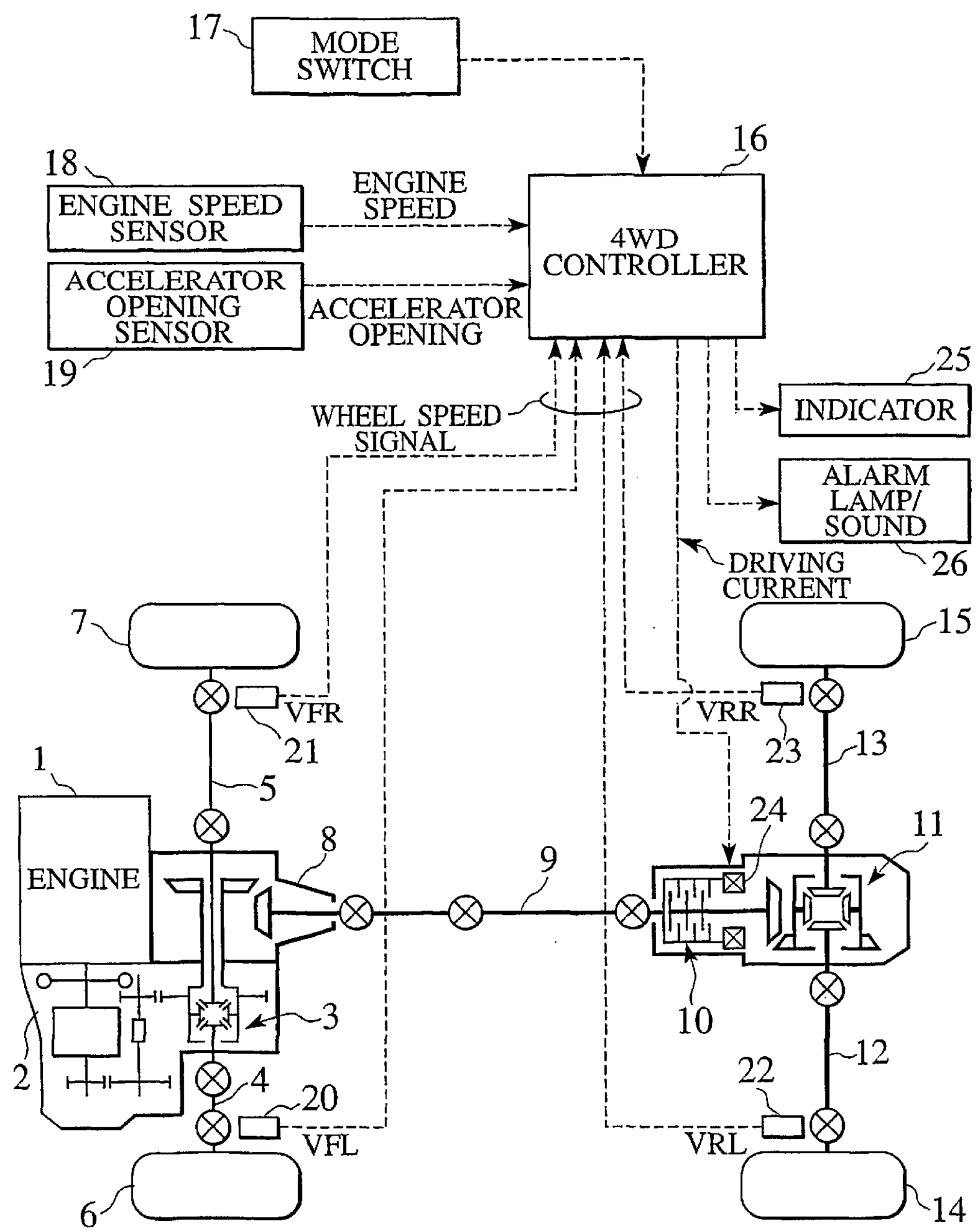
FIG. 3 is a general view showing a four-wheel-drive torque distribution control system employing a clutch temperature estimating apparatus according to a first embodiment of the present invention.

FIG. 3 is a general view showing a four-wheel-drive torque distribution control system employing a clutch temperature estimating apparatus according to the first embodiment of the present invention. The system involves an engine 1, a transmission 2, a front differential 3, left and right front drive shafts 4 and 5, left and right front wheels 6 and 7, a transfer unit 8, a propeller shaft 9, an electronic control clutch (driving clutch) 10, a rear differential 11, left and right rear drive shafts 12 and 13, and left and right rear wheels 14 and 15.

This is an FF (front engine, front drive) based vehicle in which the engine 1 generates torque, which is transmitted to the front wheels 6 and 7 through the transmission 2. Part of the torque is transmitted to the rear wheels 14 and 15 through the electronic control clutch 10 to realize four-wheel driving. A torque distribution ratio (%) between the front and rear wheels is 100:0 (%) when the clutch 10 is disengaged to achieve front-wheel driving. When the clutch 10 is completely engaged, the ratio is 50:50 (%) to equally distribute torque between the front and rear wheels. Depending on the degree of engagement of the clutch 10, the torque distribution ratio to the rear wheels continuously changes between 0% and 50%.

The electronic control clutch 10 is controlled by a driving current from a four-wheel-drive (4WD) controller 16. The controller 16 receives a mode switch signal from a mode switch 17, an engine speed signal from an engine speed sensor 18, an accelerator opening signal from an accelerator opening sensor 19, a front-left-wheel speed signal from a front-left-wheel speed sensor 20, a front-right-wheel speed signal from a front-right-wheel speed sensor 21, a rear-left-wheel speed signal from a rear-left-wheel speed sensor 22, and a rear-right-wheel speed signal from a rear-right-wheel speed sensor 23. The controller 16 provides a driving current to an electromagnet solenoid 24 of the clutch 10, a display instruction to an indicator 25, and an alarm instruction to an alarm lamp/sound device 26.

Figure 4:
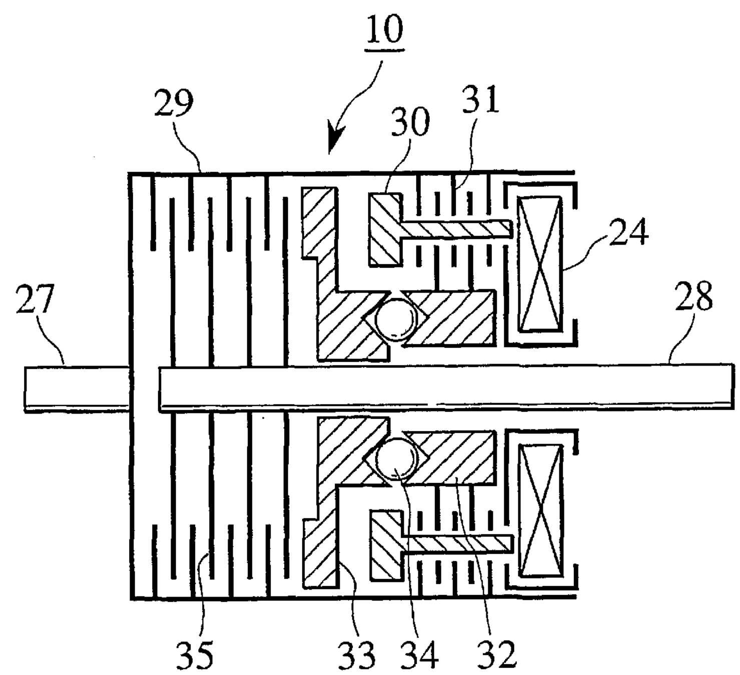
FIG. 4 roughly shows an electronic control clutch installed in the system of FIG. 3.
Figure 5:
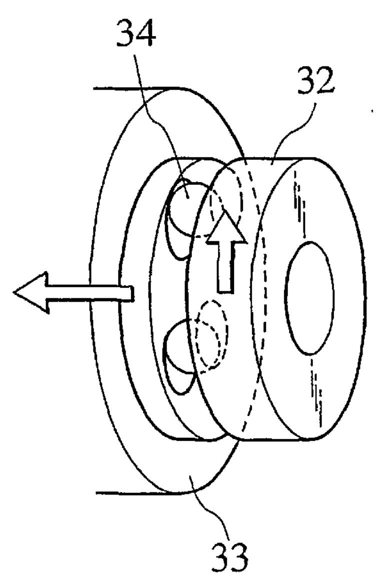
FIG. 5 is (a) a perspective view and (b) a sectional view showing a cam mechanism of the clutch of FIG. 4.
Figure 5:
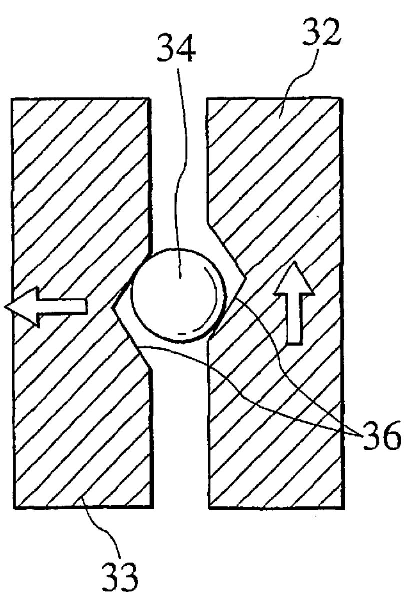

FIG. 4 roughly shows the structure of the electronic control clutch 10, and FIG. 5 is a perspective view showing the structure and operation of a cam mechanism in the clutch 10. In FIGS. 4 and 5, the electronic control clutch 10 involves the solenoid 24, an input shaft 27, an output shaft 28, a housing 29, an armature 30, a control clutch 31, a control cam 32, a main cam 33, balls 34, a main clutch 35, and cam grooves 36.

An end of the input shaft 27 is connected to the propeller shaft 9, and the other end thereof is fixed to the housing 29. The output shaft 28 is fixed to an input gear of the rear differential 11.

The control clutch 31 is interposed between the housing 29 and the control cam 32. The main clutch 35 is interposed between the housing 29 and the output shaft 28. The control cam 32, main cam 33, and the balls 34 held in the cam grooves 36 formed on the cams 32 and 33 constitute the cam mechanism of FIG. 5.

An engaging operation of the electronic control clutch 10 will be explained. The four-wheel-drive controller 16 issues an instruction to pass a current to the solenoid 24. The solenoid 24 generates a magnetic field to attract the armature 30 to the control clutch 31. The control clutch 31 generates frictional torque which is transmitted to the control cam 32. This torque is amplified and converted into axial torque through the cam grooves 36 and balls 34, to push the main cam 33 toward the front side. The main cam 33 pushes the main clutch 35, which generates frictional torque proportional to the current to the solenoid 24. The frictional torque generated by the main clutch 35 is transmitted as driving torque to the rear differential 11 through the output shaft 28.

Clutch Temperature Estimation

Figure 6:
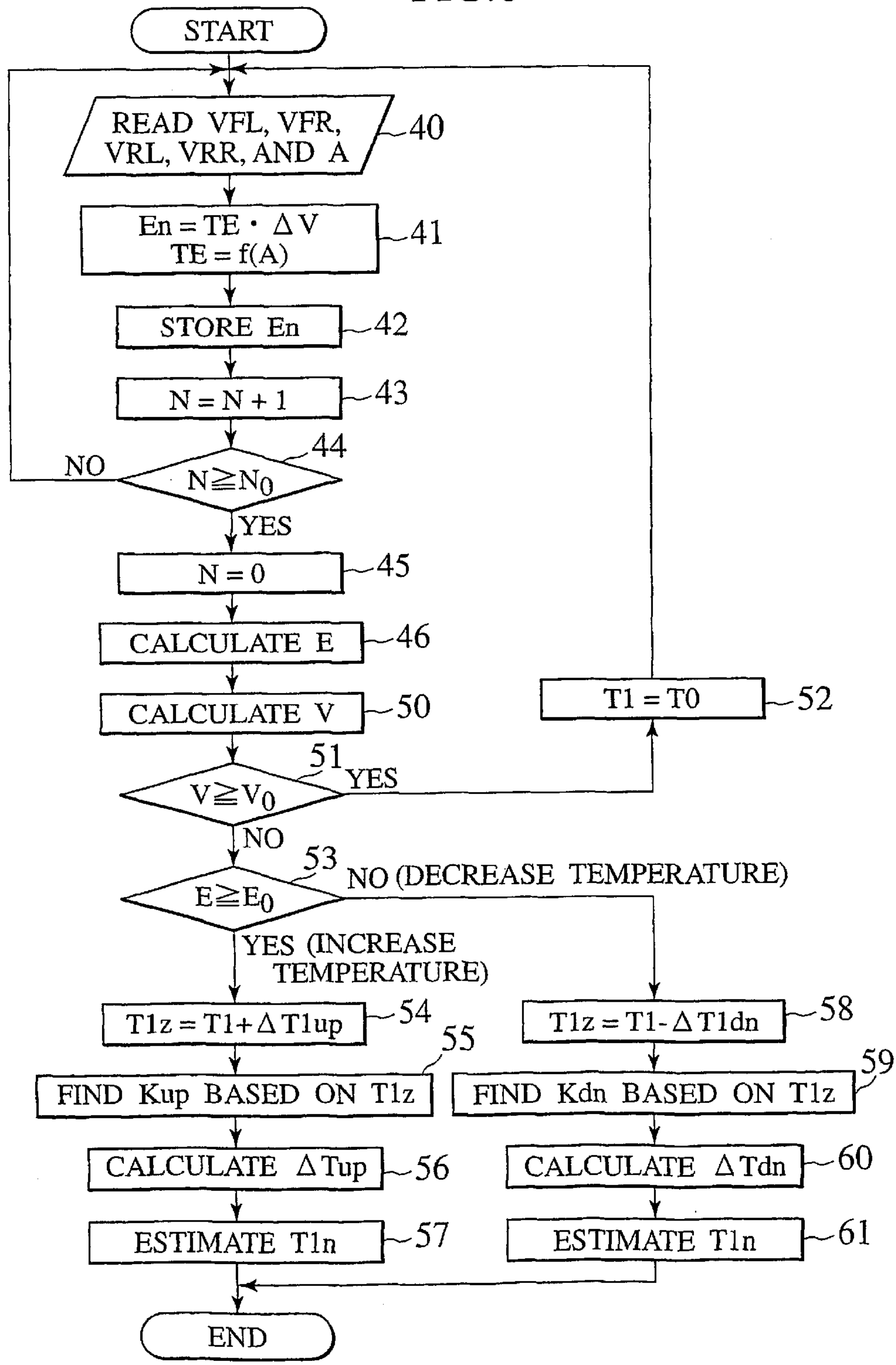
FIG. 6 is a flowchart showing a clutch temperature estimating process carried out by a four-wheel-drive controller (16) according to the first embodiment.

FIG. 6 is a flowchart showing a clutch temperature estimating process carried out by the four-wheel-drive controller 16 according to the first embodiment of the present invention.

Step 40 reads a front-left wheel speed VFL from the front-left-wheel speed sensor 20, a front-right wheel speed VFR from the front-right-wheel speed sensor 21, a rear-left wheel speed VRL from the rear-left-wheel speed sensor 22, a rear-right wheel speed VRR from the rear-right-wheel speed sensor 23, and a driving current A provided by the controller 16 to the solenoid 24. This reading step is carried out at the intervals of 20 ms.

Step 41 calculates unit input energy during sampling time or input energy rate En by multiplying clutch transmission torque $T_E$ by a front-rear clutch speed difference (rotational speed difference) $\Delta V_\omega$ between the rotation speeds of the front and rear wheels. The clutch transmission torque $T_E$[Nm] is calculated according to a relational expression of $T_E=f(A)$ based on the driving current A. The speed difference $\Delta V_\omega$ is the difference between an average of front left and right wheel speeds and an average of rear left and right wheel speeds. The unit input energy En includes the thermal energy generation ratio of the clutch 10.

Step 42 stores a value of the unit input energy En into a memory such as a RAM.

Step 43 increases a count N by one, i.e., N=N+1.

Step 44 checks to see if the count N is equal to or above a set count $N_0$ (for example, $N_0=32$). If a result of step 44 is NO, the flow returns to step 40, and if YES, the flow advances to step 45. Step 45 clears the count N, i.e., N=0.

Figure 9:
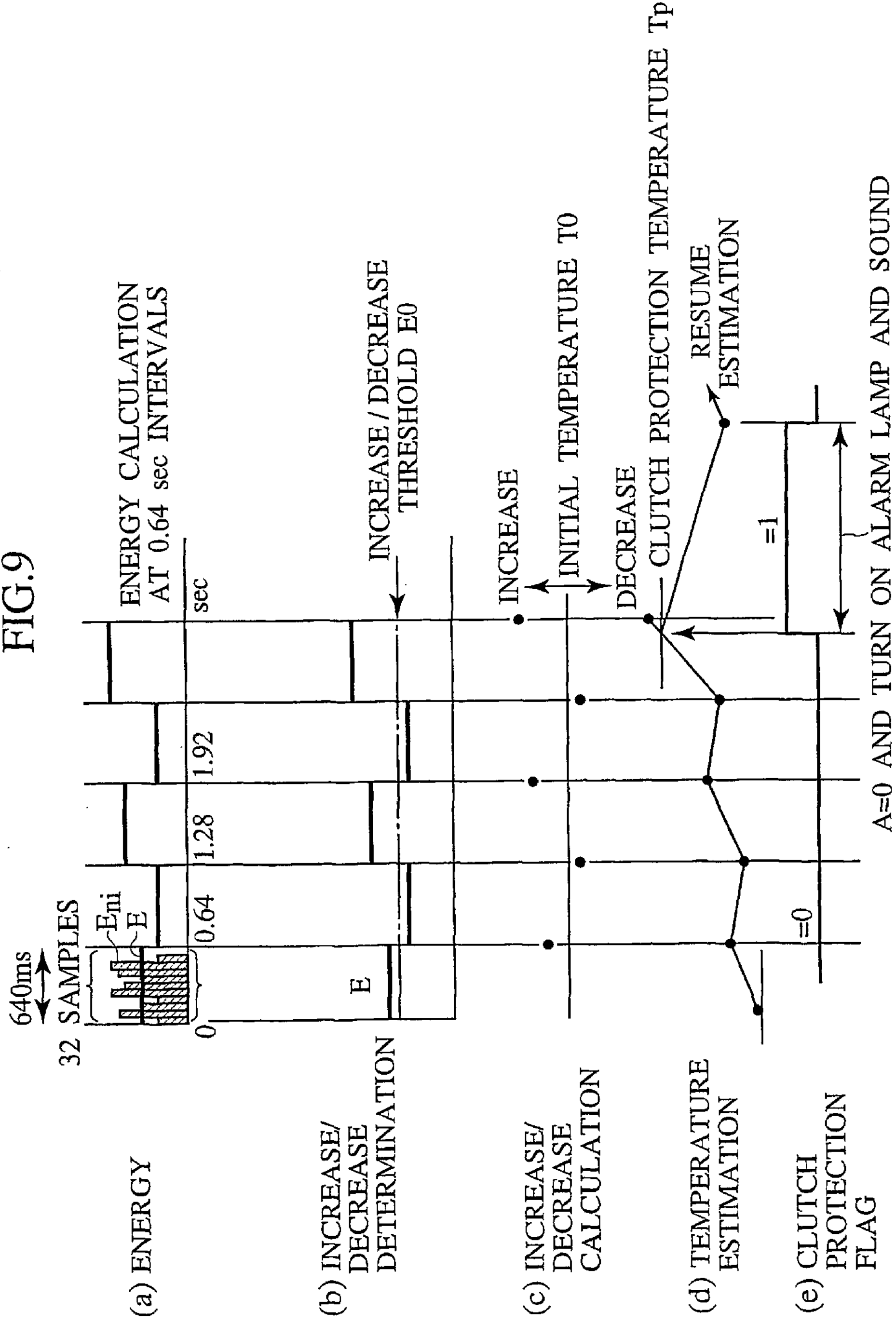
FIG. 9 is a time chart showing (a) input energy, (b) increase/decrease determination, (c) increase/decrease calculation, (d) temperature estimation, and (e) clutch protection flag according to the first embodiment.

Step 46 calculates input energy rate E by averaging the stored unit input energy values En. If $N_0=32$, the input energy E is an average of unit input energy values $En_j$ stored for a period of 640 ms (=20 ms×32) as shown in FIG. 9. Namely, $E=(\Sigma_i En_j)/N_0$ (i=1 to 32).

Step 50 calculates a vehicle speed V from an average of the rear left right wheel speeds.

Step 51 checks to see if the vehicle speed V is equal to or above an estimation limit speed $V_0$. If YES, step 52 resets an estimated clutch temperature T1 of the last time to an initial temperature T0, stops estimating clutch temperature, and carries out initialization. The estimation limit speed V0 is the upper limit of vehicle speeds allowing clutch temperature estimation. If a result of step 51 is NO, step 53 is carried out.

Step 53 checks to see if the input energy E is equal to or above an increase/decrease threshold (reference energy rate level) $E_0$. If a result of step 53 is YES, a temperature incremental estimation process of steps 54 to 57 is carried out, and if NO, a temperature decremental estimation process of steps 58 to 61 is carried out. The increase/decrease threshold $E_0$ is an energy level at which heat generation and heat radiation in the clutch 10 nearly balance with each other, to substantially keep the clutch 10 at a constant temperature. The increase/decrease threshold $E_0$ is a fixed value specific to the clutch 10.

Step 54 calculates a temporary clutch temperature T1z by adding a temporary increment ΔT1up to the estimated clutch temperature T1 of the last time. T1 is set at T0 in an initial state. The temporary increment ΔT1up is calculated based on surplus ΔEup ($=E-E_0$) of the input energy E with respect to the increase/decrease threshold $E_0$.

Step 55 finds an incremental gradient Kup according to the temporary clutch temperature T1z. More precisely, if the temporary clutch temperature T1z is within a practical driving temperature domain $D_{T1}$shown in FIGS. 8A and 8B, an incremental gradient Kup1(<1) gentler than an actual temperature gradient is employed. If the temporary clutch temperature T1z is within a high-load temperature domain $D_{T2}$, an incremental gradient Kup2 (>1) steeper than an actual temperature gradient is employed. In FIG. 8B, a segment $l_0$ corresponds to a gradient $K_0=1$.

Step 56 calculates an increment ΔTup=Kup·ΔTup where Kup is the incremental gradient found in step 55 and ΔT1up is the temporary increment set in step 54.

Step 57 estimate a clutch temperature T1n=T1 +ΔTup where T1 is the estimated clutch temperature of the last time. The estimated clutch temperature T1 of the next time will be set to the present value of T1 n.

In step 58, heat radiation is dominant in the heat balance of the clutch 10. Accordingly, step 58 calculates a temporary clutch temperature T1z by subtracting a temporary decrement ΔT1dn from the estimated clutch temperature T1 of the last time. In an initial state, T1 =T0. The temporary decrement ΔT1dn is based on an energy difference ΔEdn ($=E_0-E$) between the increase/decrease threshold $E_0$ and the input energy E. Here, the energy difference ΔEdn is set to a constant value, and therefore, the temporary decrement ΔT1dn is also a constant value.

Step 59 finds a decremental gradient Kdn according to the temporary clutch temperature T1z. If the temporary clutch temperature T1z is in the practical driving temperature domain $D_{T1}$in FIGS. 8A and 8B, a decremental gradient Kdn1 (>1) steeper than an actual temperature gradient is employed. If the temporary clutch temperature T1z is in the high-load temperature domain $D_{T2}$, a decremental gradient Kdn2 (<1) gentler than an actual temperature gradient is employed.

Step 60 calculates a decrement ΔTdn=ΔKdn·ΔT1dn according to the decremental gradient Kdn set in step 59 and the temporary decrement ΔT1dn (constant) set in step 58.

Step 61 estimates a clutch temperature T1n=T1 −ΔTdn by subtracting the temperature decrement ΔTdn from the estimated clutch temperature T1 of the last time. These are the similar manner as in steps 54–56.

Protective Clutch Control

Figure 7:
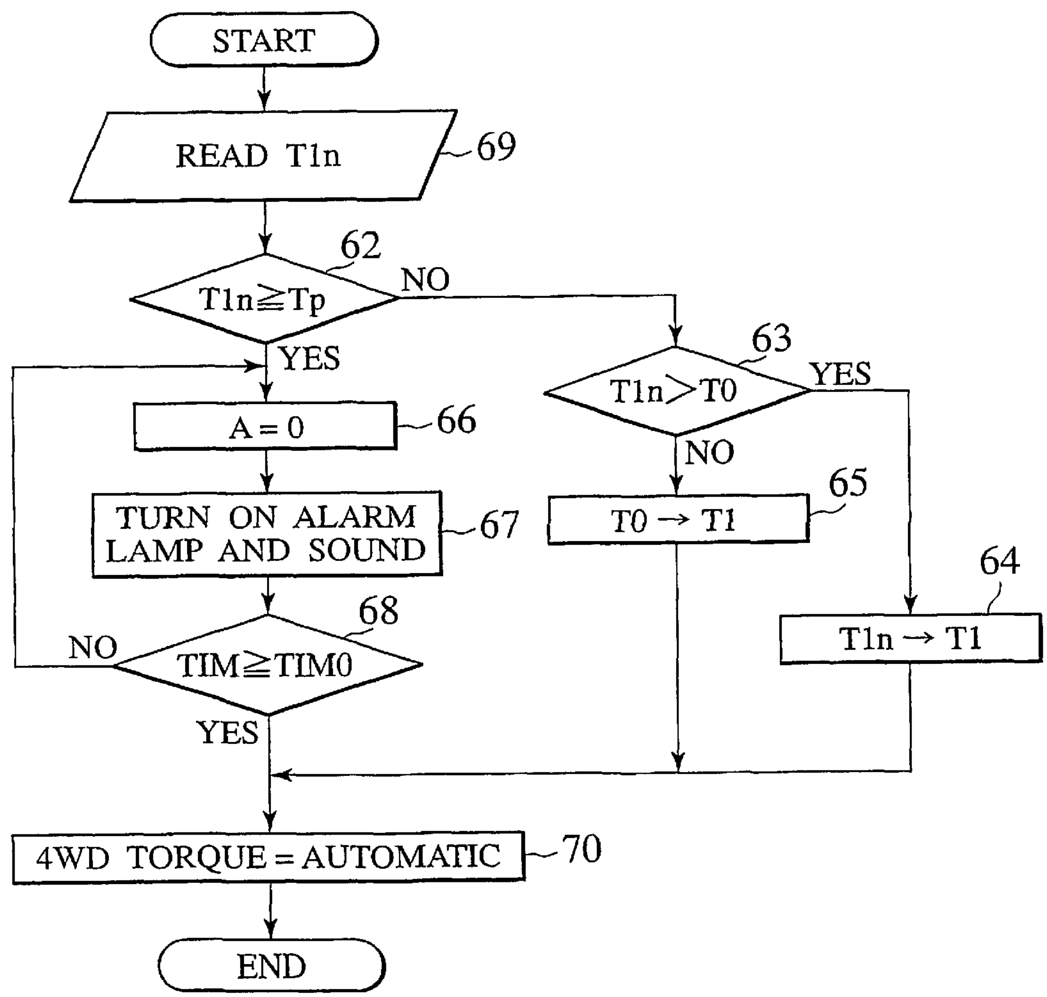
FIG. 7 is a flowchart showing protective clutch control carried out by the four-wheel-drive controller (16) according to the first embodiment.

FIG. 7 is a flowchart showing a protective clutch control process carried out by the four-wheel-drive controller 16 according to the first embodiment of the present invention. This process is carried out at the intervals of 640 ms according to the first embodiment.

Step 69 reads the estimated clutch temperature T1n of this time calculated according to the flowchart of FIG. 6.

Step 62 checks to see if T1n is equal to or above a clutch protection temperature Tp.

If T1n<Tp, step 63 checks to see if the estimated clutch temperature T1n of this time is greater than the initial temperature T0. If T1n >T0, step 64 sets the estimated clutch temperature T1n of this time as the estimated clutch temperature T1 of the last time, and step 70 is carried out. If T1n≦T0 in step 63, step 65 sets the initial temperature T0 as the estimated clutch temperature T1 of the last time, and step 70 is carried out.

If T1n≧Tp in step 62, the clutch protective control is carried out from step 66.

Step 66 zeroes the driving current A, i.e., A=0, to disengage the electronic control clutch 10.

Step 67 turns on the alarm lamp/sound device 26 to notify the driver of a protective clutch control mode.

Step 68 checks to see if a timer TIM is equal to or above a set timer value TIM0 (for example, 60 sec). The timer TIM is started when a result of step 62 is YES. Until the timer TIM reaches the set timer value TIM0, the clutch protective control of steps 66 and 67 is continued. When the timer TIM reaches the set timer value TIM0, step 70 switches the clutch 10 from the disengaged state to a normal clutch control state, or an automatic clutch control state. Namely, step 70 resumes an automatic clutch control (normal clutch control) mode.

Basics of Clutch Temperature Estimation

Driving a low-frictional road such as a sandy or snowy road will be explained. Step 41 of FIG. 6 calculates a rotational speed difference between the input and output shafts of the electronic control clutch 10 according to the front-rear wheel speed difference $\Delta V_\omega$, estimates clutch transmission torque $T_E$ of the clutch 10 according to the driving current A, and calculates unit input energy En applied to the clutch 10 by multiplying $\Delta V_\omega$ by $T_E$. Step 46 calculates input energy E according to an average of the unit input energy values En stored in the memory. As shown in FIG. 9(*a*), 32 unit input energy values En are calculated at the intervals of 20 ms, and the input energy rate E is calculated by averaging the unit input energy values En for the period of Δt=640 ms and the total input energy during the period is calculated by E×Δt.

Steps 53 to 61 of FIG. 6 check the magnitude of the calculated input energy E and estimate a clutch temperature increment or decrement according to the magnitude of the energy E. Based on the estimated clutch temperature increment or decrement, step 57 or 61 calculates an estimated clutch temperature T1n of this time.

In this way, the first embodiment estimates clutch temperatures that faithfully follow actual clutch temperatures without a temperature sensor at low cost.

Clutch Temperature Estimation on Input Energy

To estimate a clutch temperature, the first embodiment employs the increase/decrease threshold (reference energy level) $E_0$ at which the heat balance of the clutch 10 maintains a constant clutch temperature. Step 53 determines whether or not the input energy E calculated in steps 40 to 46 of FIG. 6 (input energy calculating means) is equal to or above the reference energy level $E_0$. If $E \geqq E_0$, steps 54 to 61 (temperature estimating means) add an increment ΔTup to the estimated clutch temperature T1 of the last time, to estimate a clutch temperature T1n of this time. If $E<E_0$, the temperature estimating means subtract a decrement ΔTdn from the estimated clutch temperature T1 of the last time, to estimate a clutch temperature T1n of this time.

Referring to FIG. 9(*b*), the first embodiment increases the estimated clutch temperature T1 of the last time if the input energy E is greater than the increase/decrease threshold $E_0$ and decreases the estimated clutch temperature T1 of the last time if the input energy E is below the increase/decrease threshold $E_0$. In this way, the first embodiment compares the input energy E with the increase/decrease threshold $E_0$ and estimates a clutch temperature according to a result of the comparison.

Since the first embodiment estimates a clutch temperature by comparing the input energy E with the increase/decrease threshold $E_0$ that is specific to the temperature characteristics of the clutch 10, the first embodiment is free from the influence of heat balance.

Clutch Temperature Estimation and Temperature Gradient

Figure 8A:
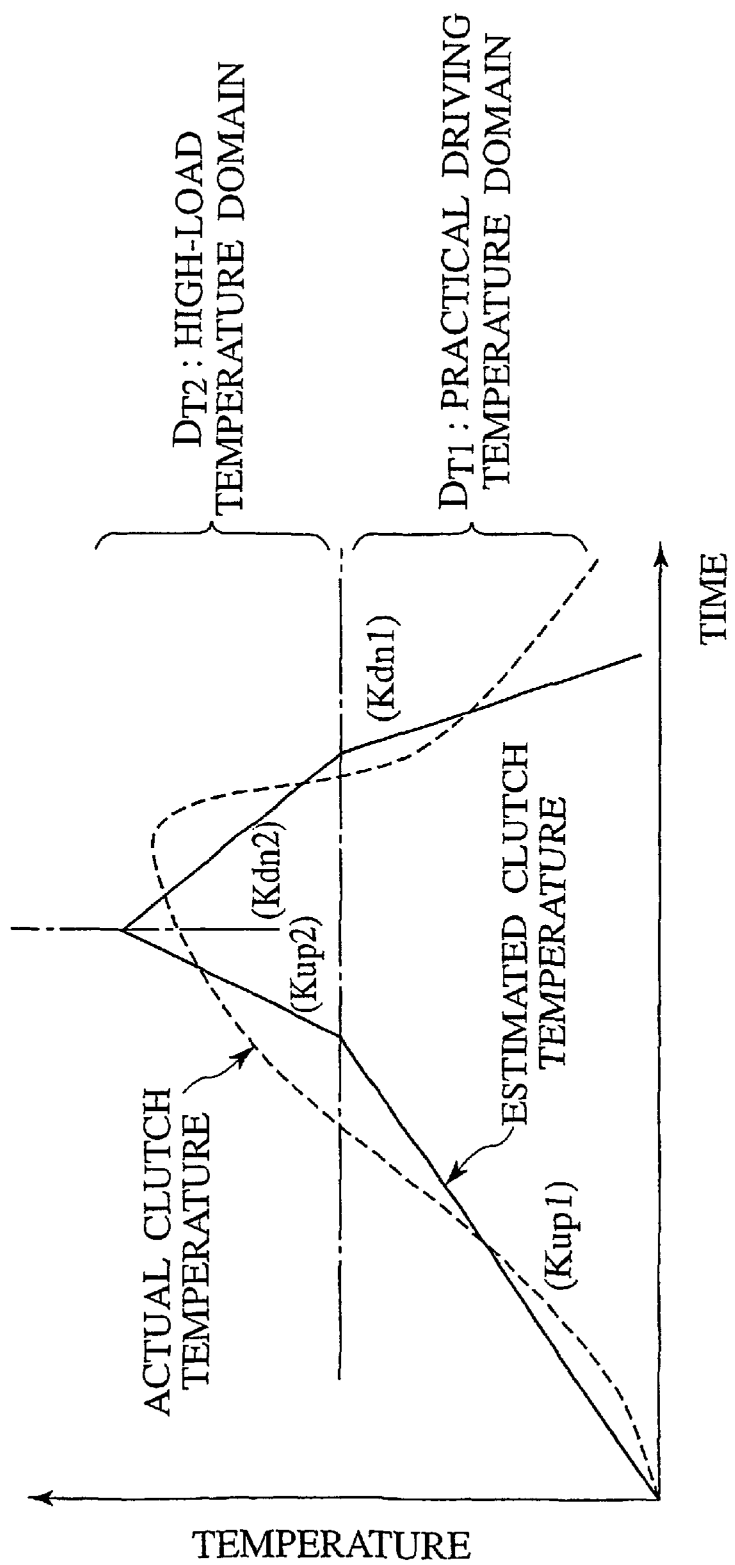
FIGS. 8A and 8B are graphs showing estimated clutch temperatures and incremental and decremental gradients according to the present invention and actual clutch temperatures.
Figure 8B:
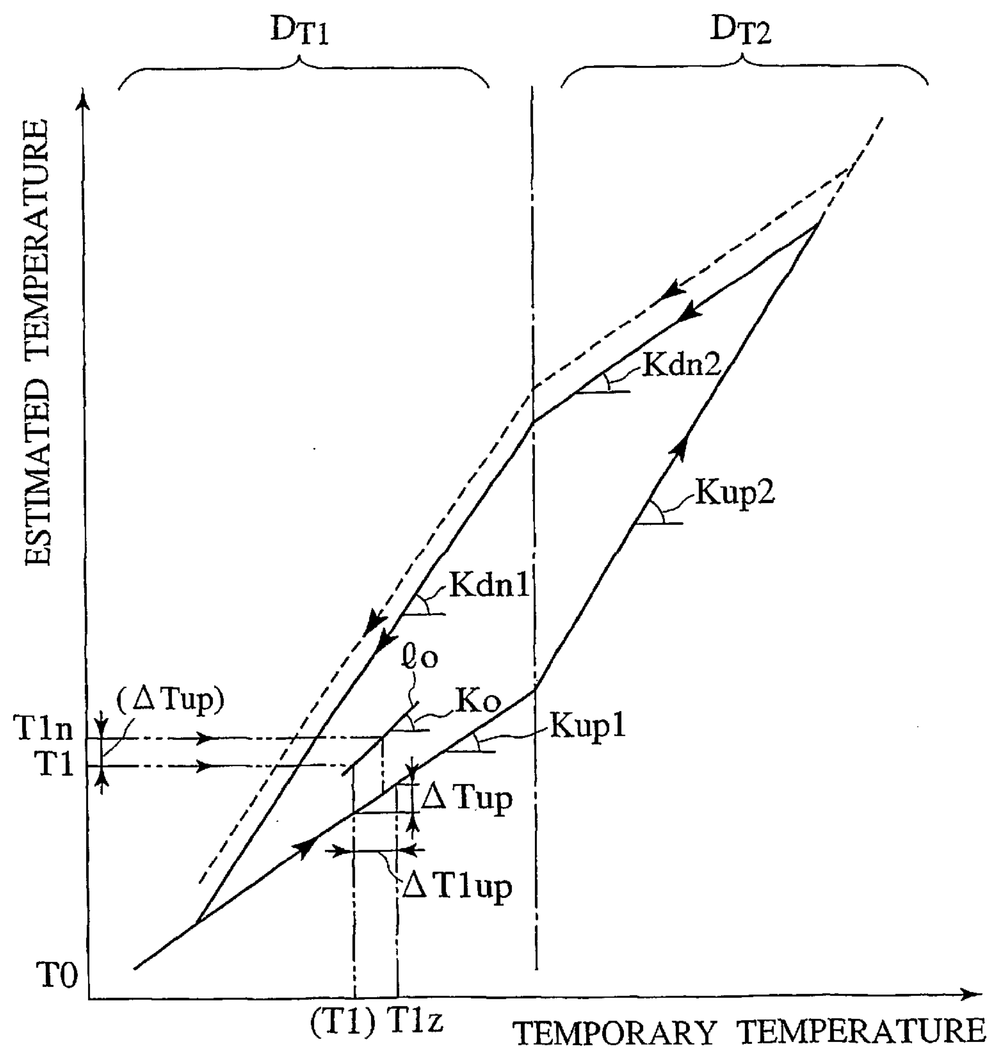

If the temporary clutch temperature T1z is in the practical driving temperature domain $D_{T1}$of FIGS. 8A and 8B, the first embodiment employs the incremental gradient Kup1 gentler than an actual temperature gradient or the decremental gradient Kdn1 steeper than an actual temperature gradient, to estimate a clutch temperature. If the temporary clutch temperature T1z is in the high-load temperature domain $D_{T2}$, the first embodiment employs the incremental gradient Kup2 steeper than an actual temperature gradient or the decremental gradient Kdn2 gentler than an actual temperature gradient, to estimate a clutch temperature.

Referring to FIG. 9(*c*), steps 55 and 56 of FIG. 6 calculate an increment ΔTup to be added to the estimated clutch temperature T1 of the last time according to the incremental gradient Kup1 or Kup2. Steps 59 and 60 of FIG. 6 calculate a decrement ΔTdn to be subtracted from the estimated clutch temperature T1 of the last time according to the decremental gradient Kdn1 or Kdn2.

When the vehicle is driving a sandy or snowy road with the temporary clutch temperature T1z being in the high-load temperature domain $D_{T2}$, the first embodiment estimates a high clutch temperature according to the incremental gradient Kup2 steeper than an actual temperature gradient. Alternatively, the embodiment employs the decremental gradient Kdn2 gentler than an actual temperature gradient, to suppress a decrease in the estimated clutch temperature. In this way, when the electronic control clutch 10 is driven under maximum conditions, the first embodiment estimates a clutch temperature severer than an actual temperature, to surely protect the clutch 10.

When the vehicle is driving a normal road with the temporary clutch temperature T1 z being in the practical driving temperature domain $D_{T1}$, the first embodiment employs the temperature increment coefficient Kup1 gentler than an actual temperature gradient, to make estimated clutch temperatures continuous from the practical driving temperature domain $D_{T1}$ to the high-load temperature domain $D_{T1}$. Alternatively, the first embodiment employs the decremental gradient Kdn1 steeper than an actual temperature gradient, to quickly decrease estimated clutch temperatures toward a normal clutch control level. With these techniques, the first embodiment prevents estimated clutch temperatures from deviating from actual clutch temperatures, thereby correctly carrying out the protective clutch control even in the practical driving temperature domain $D_{T1}$.

In each of the practical driving temperature domain $D_{T1}$and high-load temperature domain $D_{T2}$, the first embodiment is capable of properly estimating clutch temperatures according to driving scenes.

Termination of Clutch Temperature Estimation

The first embodiment sets the estimation limit speed $V_0$. If the vehicle speed V is equal to or above the estimation limit speed $V_0$ in steps 51 and 52 (estimation terminating means) of FIG. 6, no clutch temperature (T1n) is estimated in steps 53 to 61, and the estimated clutch temperature T1 of the last time is reset to the initial value T0. This prevents an accumulation of errors due to continuous temperature estimations and improves the accuracy of clutch temperature estimation.

Clutch Temperature Compensation

If the estimated clutch temperature T1n of this time is equal to or above the clutch protection temperature Tp in FIG. 7, the first embodiment carries out the protective clutch control to decrease the temperature of the electronic control clutch 10 by disengaging the clutch 10 for a set time.

Figure 1A:
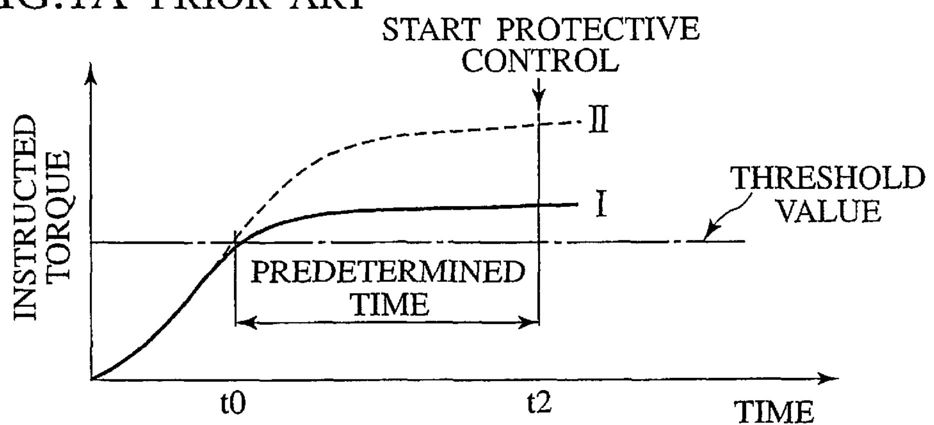
FIGS. 1A and 1B are time charts showing conditions to start protective clutch control according to a prior art.
Figure 1B:
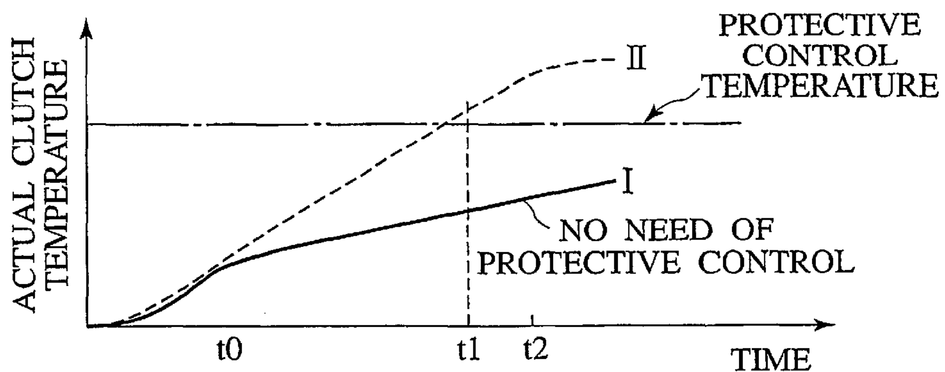
Figure 2:
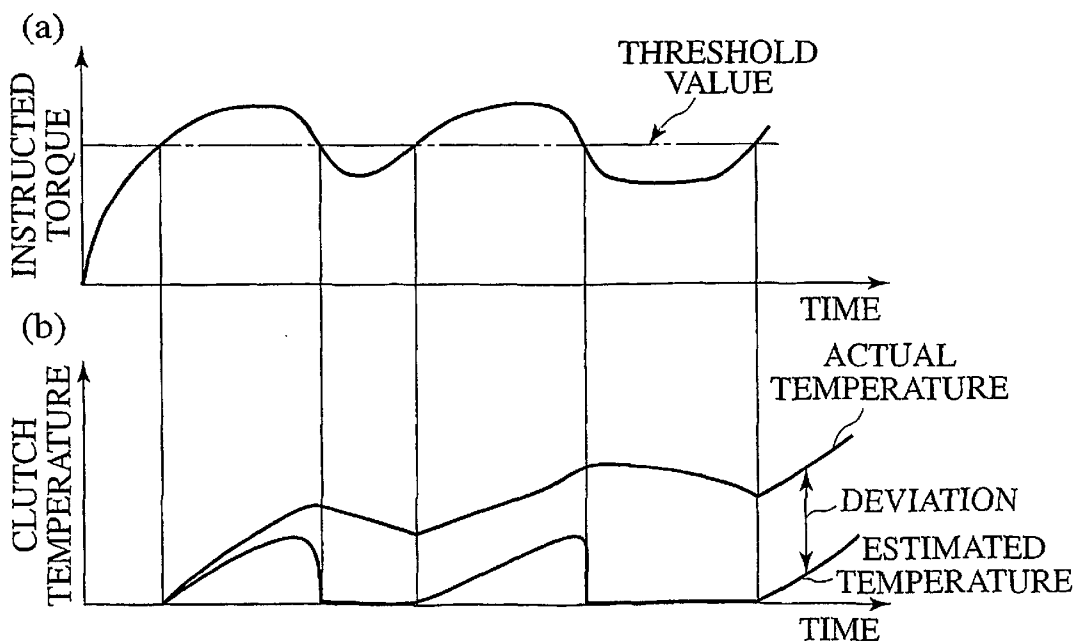
FIG. 2 shows a graph (a) of instructed torque values and a graph (b) of actual and estimated clutch temperatures corresponding to the instructed torque values.

The first embodiment calculates input energy rate E applied to the clutch 10 according to a relative clutch slide (front-rear rotational speed difference $\Delta V_\omega$ and clutch transmission torque $T_E$, estimates a clutch temperature variation according to the input energy E, and estimates a clutch temperature T1n. In the case of the prior art of FIG. 2, an estimated clutch temperature is reset to an initial value whenever an instructed torque value falls below a threshold. Unlike the prior art, the first embodiment of the present invention increases and decreases the estimated clutch temperature T1 of the last time in response to input energy rate E as shown in FIG. 9(*d*). Namely, the first embodiment estimates clutch temperatures that correctly follow actual clutch temperatures.

The first embodiment estimates clutch temperatures that substantially follow actual clutch temperatures without a temperature sensor at low cost. Even in an environment to suddenly change driving conditions, the first embodiment is capable of controlling the temperature of the clutch 10. When the vehicle drives a sandy or snowy road with the clutch being frequently driven to transmit maximum torque, the first embodiment is capable of surely controlling the temperature of the clutch 10.

The first embodiment estimates an increased clutch temperature if the input energy rate E is above the increase/decrease threshold $E_0$ and a decreased clutch temperature if E is below $E_0$. In this way, the first embodiment collectively grasps the energy balance of the clutch 10, checks the magnitude of the input energy rate E, and estimates a clutch temperature without the influence of the heat flow fluctuation.

When the vehicle is driving a sandy or snowy road with the temporary clutch temperature T1z being in the high-load temperature domain $D_{T2}$, the first embodiment employs the incremental gradient Kup2 steeper than an actual temperature gradient to estimate a higher clutch temperature, or the decremental gradient Kdn2 gentler than an actual temperature gradient, to estimate a gently-lowered temperature. Namely, the first embodiment estimates a clutch temperature severer than an actual temperature under severe clutch operating conditions, to surely protect the electronic control clutch 10.

When the vehicle is driving a normal road with the temporary clutch temperature T1z being in the practical driving temperature domain $D_{T1}$, the first embodiment employs the incremental gradient Kup1 gentler than an actual temperature gradient, to make estimated clutch temperatures continuous from the practical driving temperature domain $D_{T1}$ to the high-load temperature domain $D_{T2}$. Also, the first embodiment employs the decremental gradient Kdn1 steeper than an actual temperature gradient to estimate clutch temperatures that rapidly decrease toward a normal clutch control level. This prevents the estimated clutch temperatures from deviating from actual clutch temperatures and surely controls clutch operation in the practical driving temperature domain $D_{T1}$.

When the vehicle speed V is above the estimation limit speed $V_0$, the first embodiment terminates clutch temperature estimation and resets the estimated clutch temperature T1 of the last time to the initial temperature T1. This prevents an accumulation of errors in continuous temperature estimations and improves the accuracy of clutch temperature estimation.

The electronic control clutch 10 is a driving clutch arranged to partly deliver engine torque from front wheels to rear wheels. The estimated clutch temperature T1n of this time is used to carry out protective clutch control to prevent the overheating of the clutch 10. Without a temperature sensor, the first embodiment estimates, at low cost, clutch temperatures that follow actual clutch temperatures. Even if the clutch 10 frequently transmits maximum torque, the first embodiment surely compensates the temperature of the clutch 10.

Second Embodiment

An apparatus for and a method of estimating a clutch temperature according to the second embodiment of the present invention will be explained. The second embodiment employs the same structure as that of the first embodiment of FIG. 3. According to the second embodiment, the wheel speed sensors 20 to 23 are arranged on the wheels of a vehicle, respectively. The left and right front wheel speed sensors 20 and 21 provide left and right front wheel speeds VFL and VFR. The left and right rear wheel speed sensors 22 and 23 provide left and right rear wheel speeds VRL and VRR. The second embodiment calculates an average of VFL and VFR and an average of VRL and VRR, and based on the averages, calculates a front-rear wheel speed difference (rotational clutch speed difference) $\Delta V_\omega$ of the electronic control clutch 10. The second embodiment compares the speed difference ΔV with a minimum speed difference ΔVmin set according to a detection limit of the sensors 20 to 23, and if $\Delta V_\omega \leqq \Delta Vmin$, zeroes the speed difference $\Delta V_\omega$.

The second embodiment employs the same structure as that of the first embodiment shown in FIGS. 3 to 5, and therefore, the detailed explanation and depiction of the structure of the second embodiment are omitted.

Clutch Temperature Estimation

Figure 10:
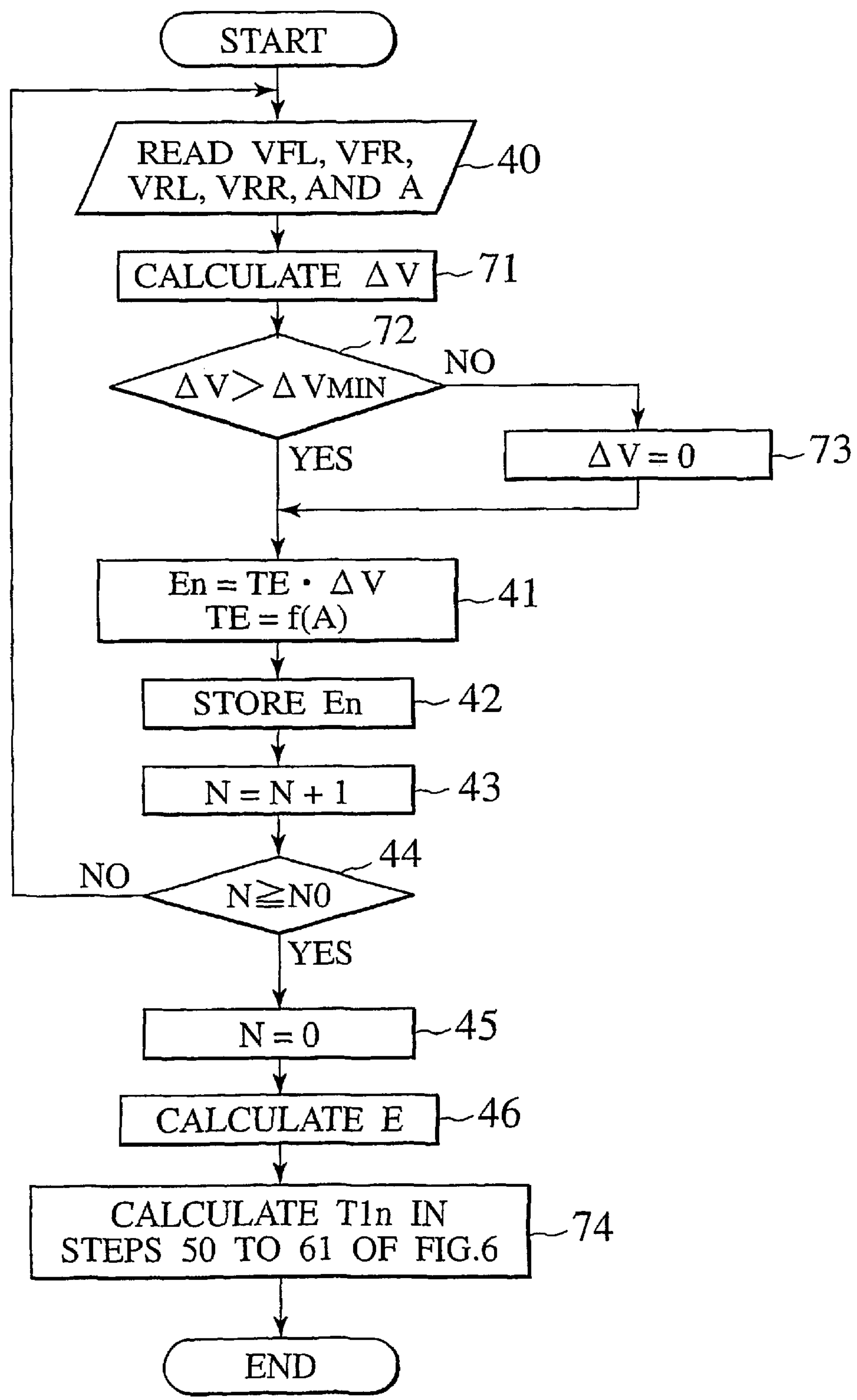
FIG. 10 is a flowchart showing a clutch temperature estimating process carried out by a four-wheel-drive controller according to a second embodiment of the present invention.

FIG. 10 is a flowchart showing clutch temperature estimation carried out by the four-wheel-drive controller 16 according to the second embodiment.

Step 40 reads a front-left wheel speed VFL from the front-left-wheel speed sensor 20, a front-right wheel speed VFR from the front-right-wheel speed sensor 21, a rear-left wheel speed VRL from the rear-left-wheel speed sensor 22, a rear-right wheel speed VRR from the rear-right-wheel speed sensor 23, and a driving current A provided by the controller 16 to the solenoid 24. This reading step is carried out at the intervals of 20 ms.

Step 71 calculates an average of VFL and VFR and an average of VRL and VRR, and according to the difference between the averages, calculates a front-rear wheel speed difference ΔV of the electronic control clutch 10.

Step 72 checks to see if $\Delta V_\omega$ is greater than the minimum speed difference ΔVmin, which is set according to the detection limit of the wheel speed sensors 20 to 24. If $\Delta V_\omega > \Delta Vmin$, step 41 is carried out. If $\Delta V_\omega \leqq \Delta Vmin$, step 73 is carried out. The wheel speed sensors 20 to 23 have each a detection limit $V_L$ of, for example, 2.7 km/h. In this case, $\Delta Vmin = V_L/2 = 1.35$ km/h.

Step 73 sets $\Delta V_\omega = 0$, and advances to step 41. Step 41 calculates unit input energy En[J/s] by multiplying clutch transmission torque $T_E$[Nm]by $\Delta V_\omega$[rad/s]. If step 73 sets $\Delta V_\omega = 0$, then $En = T_E \cdot 0 = 0$. The clutch transmission torque $T_E$ is calculated from the driving current A.

Steps 42 to 46 are the same as those of the first embodiment of FIG. 6, and therefore, will not be explained again. Step 74 carries out steps 50 to 61 of FIG. 6 to estimate a clutch temperature T1n.

Input Energy Calculation

If the front-rear wheel speed difference $\Delta V_\omega$ is greater than the minimum speed difference ΔVmin, the flowchart of FIG. 10 follows steps 40, 71, 72, and 41, to use $\Delta V_\omega$ calculated in step 71 as it is to calculate unit input energy En.

If $\Delta V_\omega$ is equal to or smaller than ΔVmin, the flowchart of FIG. 10 follows steps 40, 71, 72, 73, and 41, to calculate unit input energy En of 0 with $\Delta V_\omega = 0$ set in step 73.

The wheel speed sensors 20 to 23 include each, for example, a sensor body for detecting magnetic flux and a sensor rotor that rotates together with a wheel and generates magnetic flux to be detected by the sensor body. The sensor body converts the detected magnetic flux into a sinusoidal voltage, converts the sinusoidal voltage into pulses, counts the pulses, and determines a wheel speed according to the pulse count. If the rotation speed of the sensor rotor that turns together with a wheel is very slow, the number of counted pulses decreases as a detection time is shortened. This results in fluctuating detected wheel speeds. The wheel speed sensors 20 to 23 have a minimum detection speed which the wheel speed sensors 20 to 23 can detect without fluctuations. If an actual wheel speed is, for example, zero lower than the minimum detection speed, the minimum detection speed serves as a detected wheel speed.

Figure 11:
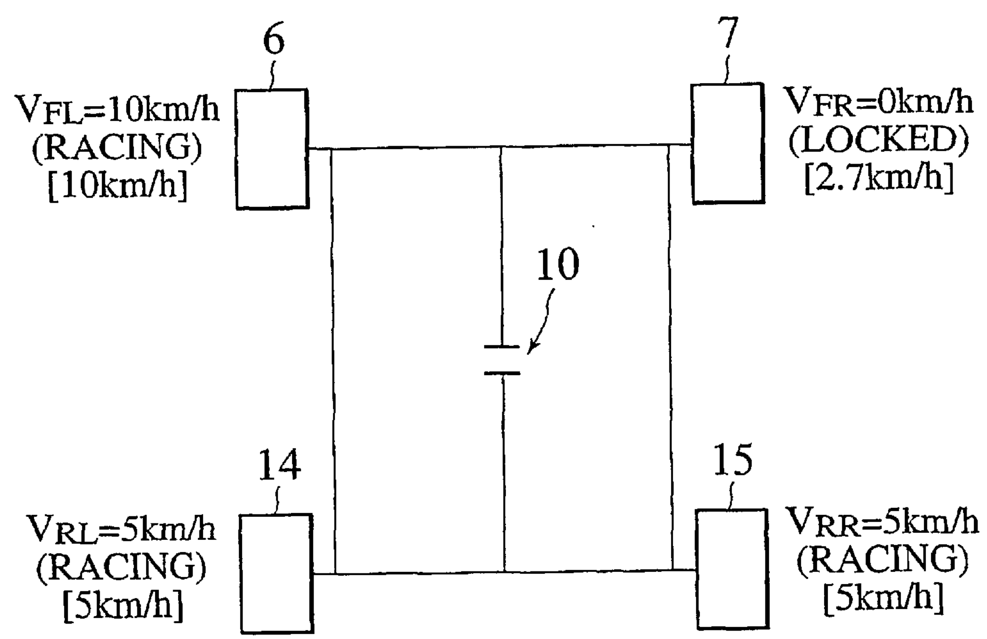
FIG. 11 roughly shows a four-wheel-drive vehicle with a wheel being locked and three wheels racing according to the second embodiment.

If a right front wheel is locked and the other three wheels are racing as shown in FIG. 11, an actual front-rear wheel speed difference ΔVs is zero as follows:

$$\begin{aligned} \Delta Vs &= (VFL+VFR)/2-(VRL+VRR)/2 \\ &= (10+0)/2-(5+5)/2 = 0 \end{aligned} \quad (1)$$

It is detected, however, that the locked right front wheel has a speed of the minimum detection speed of 2.7 km/h. As a result, a front-rear wheel speed difference ΔVm is calculated as follows:

$$\begin{aligned} \Delta Vm &= (VFL+VFR)/2-(VRL+VRR)/2 \\ &= (10+2.7)/2-(5+5)/2 = 1.35 \end{aligned} \quad (2)$$

In this way, the front-rear wheel speed difference ΔVm is usually detected. Another instance of detecting a front-rear wheel speed difference ΔV although there is no slide in the clutch 10 is when the vehicle is driving an irregular road to vibrate the driving system of the vehicle.

If the speed difference ΔVm is detected when there is no actual slide in the clutch 10, a clutch temperature estimated from the input energy rate E will be increased to deviate from an actual clutch temperature.

To cope with this problem, the second embodiment zeroes the rotational speed difference $\Delta V_\omega$ used to calculate the input energy rate E, if the $\Delta V_\omega$ is smaller than the minimum speed difference ΔVmin. This eliminates the deviation of an estimated clutch temperature from an actual clutch temperature, thereby improving the accuracy of clutch temperature estimation.

Third Embodiment

Unlike the first embodiment that disengages the electronic control clutch 10 for a set period to achieve two-wheel drive if the estimated clutch temperature T1n is above the clutch protection temperature Tp, the third embodiment fully engages the clutch 10 to completely lock the clutch to a four-wheel-drive state if T1n≧Tp. If T1n reaches a clutch limit temperature Tc, the third embodiment disengages the clutch 10 to achieve two-wheel drive. The structure of the third embodiment is the same as that of the first embodiment, and therefore, the detailed explanation and depiction of the structure of the third embodiment are omitted. The input energy and clutch temperature estimating processes carried out by the controller 16 according to the third embodiment are the same as those of the first embodiment, and therefore, will not be explained again.

Protective Clutch Control

Figure 12:
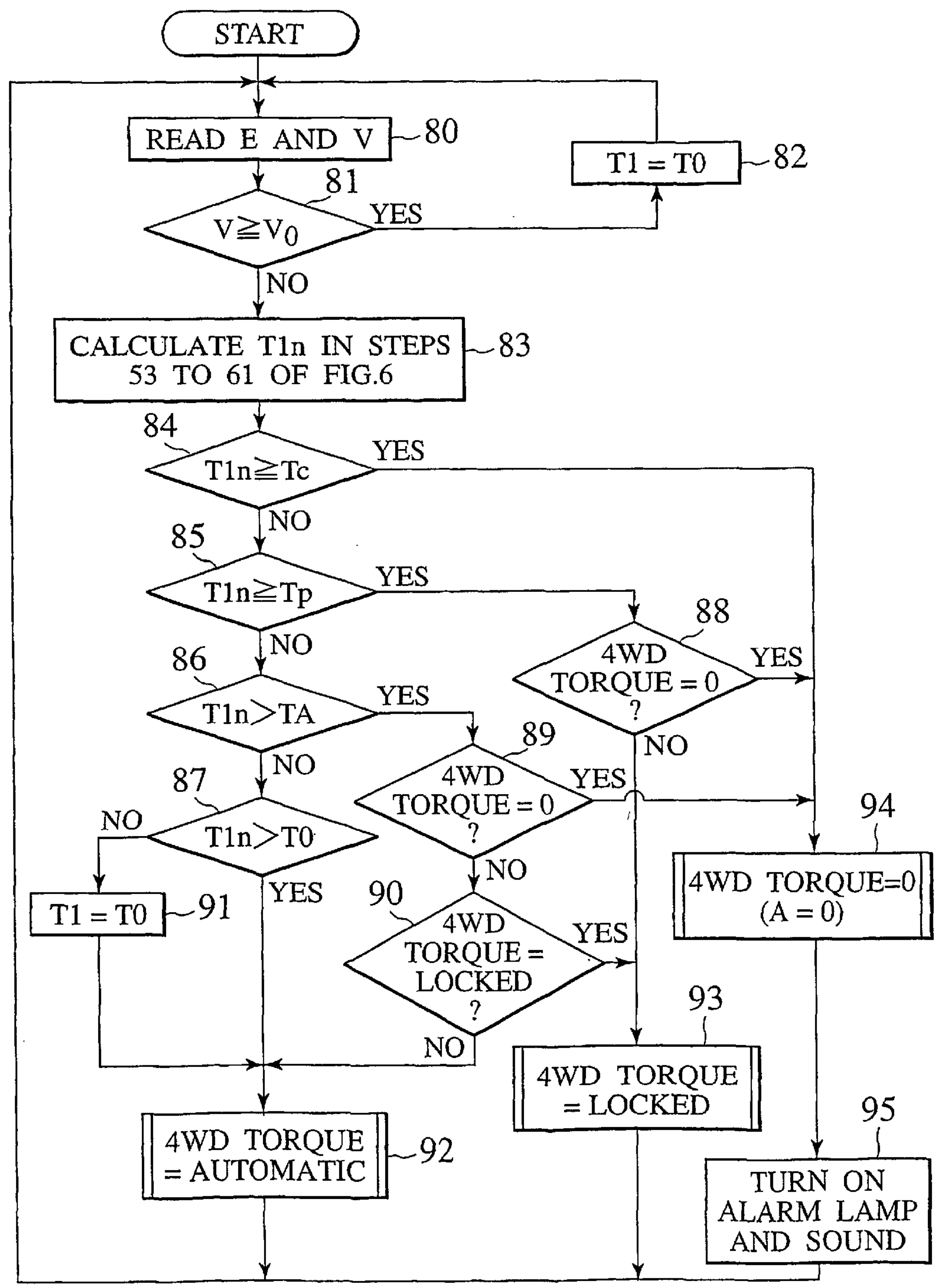
FIG. 12 is a flowchart showing protective clutch control carried out by a four-wheel-drive controller according to a third embodiment of the present invention.

FIG. 12 is a flowchart showing protective clutch control carried out by the four-wheel-drive controller 16 according to the third embodiment of the present invention. The flow of FIG. 12 is carried out at the intervals of 640 ms.

Step 80 reads the input energy E and vehicle speed V calculated by the routine of FIG. 6.

Step 81 checks to see if the vehicle speed V is equal to or higher than the estimation limit speed $V_0$. If a result of step 81 is YES, step 82 sets the estimated clutch temperature T1 of the last time to the initial temperature T1, terminates the clutch temperature estimation, and resets to an initial state. The estimation limit speed $V_0$ is a maximum vehicle speed up to which the clutch temperature estimation is allowed. If step 81 is NO, step 83 is carried out.

Step 83 calculates an estimated clutch temperature T1n of this time like the first embodiment (steps 53 to 61 of FIG. 6).

Step 84 checks to see if T1n is equal to or higher than the clutch limit temperature Tc. If YES, step 94 is carried out, and if NO, step 85 is carried out.

Step 85 checks to see if T1n is equal to or higher than the clutch protection temperature Tp. If YES, step 88 is carried out, and if NO, step 86 is carried out.

Step 86 checks to see if T1n is greater than an automatic mode (normal clutch control) temperature $T_A$. If YES, step 89 is carried out, and if NO, step 87 is carried out.

Step 87 checks to see if T1n is greater than the initial temperature T1. If YES, step 92 is carried out, and if NO, step 91 is carried out.

Step 88 checks to see if 4WD torque=0. Here, "4WD torque" is the torque transmitted through the electronic control clutch 10. If 4WD torque=0, the clutch 10 is disengaged to transmit no torque. If step 88 is YES, step 94 is carried out, and if NO, step 93 is carried out.

Step 89 checks to see if 4WD torque=0. If YES, step 94 is carried out, and if NO, step 90 is carried out.

Step 90 checks to se if 4WD torque is locked, i.e., if the clutch 10 is locked in a fully engaged state. If YES, step 93 is carried out, and if NO, step 92 is carried out.

Step 91 resets the estimated clutch temperature T1 of the last time to the initial temperature T0 after step 87 determines that T1n≦T0.

If step 90 determines that 4WD torque is not locked, or if step 87 determines that T1n>T0, or if step 91 sets T1 =T0, step 92 sets 4WD torque to automatic, so that the electronic control clutch 10 is variably engaged under normal front-rear-wheel torque distribution control according to four-wheel-drive control rules, such as speed difference adaptive control rules to increase the engagement of the clutch 10 as the front-rear wheel speed difference increases.

If step 88 determines that 4WD torque is not zero, or if step 90 determines that 4WD torque is locked, step 93 locks 4WD torque by maximizing the driving current A, to fully engage the clutch 10.

If step 84 determines that T1n≧Tc, or if step 88 or 89 determines that 4WD torque=0, step 94 sets 4WD torque as null by zeroing the driving current A to disengage the clutch 10, thereby carrying out the protective clutch control.

Step 95 turns on the alarm lamp/sound device 26 to inform the driver of the protective clutch control mode.

Clutch Temperature Compensation

The temperature compensation of the electronic control clutch 10 will be explained with reference to FIGS. 12 and 13.

(1) In the case of T1≧Tc

An assumption is made that the vehicle is driving a desert road at a vehicle speed V lower than the estimation limit speed $V_0$ and a steep incremental gradient is involved in estimating a clutch temperature. Between t0 and t1 of FIG. 13, the flowchart of FIG. 12 follows steps 80, 81, 83, 84, 85, 86, 87, 91, and 92, in which step 91 sets the estimated clutch temperature T1 of the last time to the initial temperature T0 and step 92 sets 4WD torque to automatic, to achieve the automatic clutch control (normal clutch control).

Figure 13:
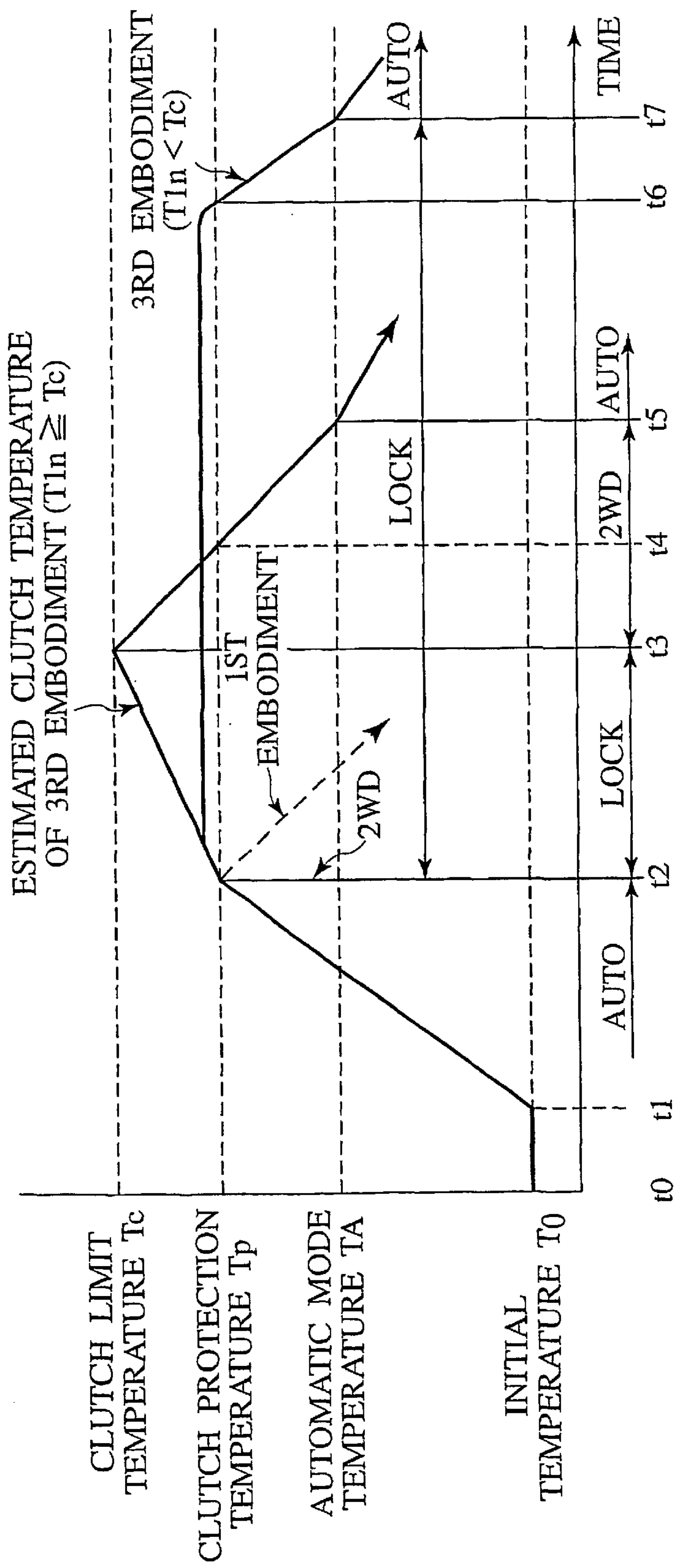
FIG. 13 is a time chart showing examples of protective clutch control and a resumption of normal clutch control according to the third embodiment.

Between t1 and t2 of FIG. 13, the estimated clutch temperature T1n of the time increases toward the clutch protection temperature Tp. During the period of t1 to t2, the flowchart of FIG. 12 follows steps 80, 81, 83, 84, 85, 86, 87, and 92, in which step 92 sets 4WD torque to automatic.

At time t2 of FIG. 13, the estimated clutch temperature T1n reaches the clutch protection temperature Tp. Then, the flowchart of FIG. 12 follows steps 80, 81, 83, 84, and 85. Step 85 determines that T1n≧Tp, and step 88 is carried out. If step 88 determines that 4WD torque is not equal to 0, step 93 is carried out. Step 93 changes 4WD torque from automatic to locked. Between t2 and t3 of FIG. 13, T1n≧Tp and the estimated clutch temperature T1n reaches the clutch limit temperature Tc. During the period of t2 to t3, the flowchart of FIG. 12 follows steps 80, 81, 83, 84, 85, 88, and 93, to maintain the locked 4WD torque.

Locking 4WD torque suppresses input energy and temperature increase gradient. In spite of this, the estimated clutch temperature T1n reaches the clutch limit temperature Tc at t3 of FIG. 13. Then, the flowchart of FIG. 12 follows steps 80, 81, 83, and 84. Step 84 determines that T1n≧Te, step 94 changes 4WD torque from locked to zero, and step 95 turns on the alarm lamp/sound device 26.

Between t3 and t4 of FIG. 13, T1n≧Tp, and the estimated clutch temperature T1n decreases because 4WD torque–0 (the clutch 10 is disengaged). During this period of t3 to t4, the flowchart of FIG. 12 follows steps 80, 81, 83, 84, 85, 88, 94, and 95, to keep 4WD torque=0 and turn on the alarm lamp/sound device 26. Between t4 and t5 of FIG. 13, TA<T1n<Tp, and 4WD torque=0 to decrease the estimated clutch temperature T1n. During this period of t4 to t5, the flowchart of FIG. 12 follows steps 80, 81, 83, 84, 85, 86, 89, 94, and 95, to keep 4WD torque=0 and turn on the alarm lamp/sound device 26.

At time t5 of FIG. 13, the estimated clutch temperature T1n decreases to the automatic mode temperature TA. At this time, the flowchart of FIG. 12 follows steps 80, 81, 83, 84, 85, 86, 87, and 92, in which step 92 changes 4WD torque from null to automatic and maintains the automatic 4WD torque.

(2) In the case of Tp≦T1 <Tc

Between t0 and t2 of FIG. 13, 4WD torque is automatic. At t2, the estimated clutch temperature T1n reaches the clutch protection temperature Tp, and 4WD torque is changed from automatic to locked. These are the same as those of the case T1≧Tc.

Between t2 and t6 of FIG. 13, T1n≧Tp. During this period, the flowchart of FIG. 12 follows steps 80, 81, 83, 84, 85, 88, and 93 to maintain 4WD torque=locked.

Locking 4WD torque gradually decreases clutch temperatures, and at t6 of FIG. 13, the estimated clutch temperature T1n decreases below the clutch protection temperature Tp. At this time, the flowchart of FIG. 12 follows steps 80, 81, 83, 84, 85, 86, 89, and 90. If step 90 determines that 4WD torque is locked, step 93 keeps the locked 4WD torque.

At t7 of FIG. 13, the estimated clutch temperature T1n decreases to the automatic mode temperature $T_A$. At this time, the flowchart of FIG. 12 follows steps 80, 81, 83, 84, 85, 86, 87, and 92. Step 92 changes the 4WD torque from locked to automatic and maintains the automatic 4WD torque.

Clutch Protection

The protective clutch control of the third embodiment employs the clutch limit temperature Tc that is higher than the clutch protection temperature Tp. When the estimated clutch temperature T1n exceeds the clutch protection temperature Tp, the third embodiment strengthens clutch engagement by locking 4WD torque, i.e., by locking the electronic control clutch 10 to a fully engaged state. When the estimated clutch temperature T1n increases to the clutch limit temperature Tc, the third embodiment disengages the clutch 10, i.e., null 4WD torque.

According to the first embodiment, the protective clutch control disengages the clutch 10 if the estimated clutch temperature T1n exceeds the clutch protection temperature Tp. In this case, the vehicle is in two-wheel-drive state at t2 of FIG. 13, to shorten the distance and time of a four-wheel-drive state that realizes high driving performance and turning stability.

Unlike the first embodiment, the third embodiment enhances clutch engagement if the estimated clutch temperature T1n steeply increases to exceed the clutch protection temperature Tp. Enhancing clutch engagement decreases a front-rear clutch speed difference and makes the temperature increase gradient of the estimated clutch temperature T1n gentler, to secure the four-wheel-drive state until the protective clutch control starts at t3 of FIG. 13.

When the estimated clutch temperature T1n reaches the clutch limit temperature Tc, the third embodiment carries out the protective clutch control to disengage the clutch 10 like the first embodiment. This prevents the clutch 10 from heating beyond the clutch limit temperature Tc.

The first protective clutch control of locking 4WD torque may suppress an increase in the estimated clutch temperature T1n and prevent the estimated clutch temperature T1n from reaching the clutch limit temperature Tc. If the estimated clutch temperature T1n is continuously below the clutch limit temperature Tc, the four-wheel-drive state is maintained like the period of t2 to t7 of FIG. 13.

Resumption of Automatic Mode

The third embodiment sets the automatic mode temperature $T_A$ that is lower than the clutch protection temperature Tp. If the estimated clutch temperature T1n exceeds the clutch protection temperature Tp, the third embodiment enhances clutch engagement (T1n<Tc in FIG. 13). If the estimated clutch temperature T1n reaches the clutch limit temperature Tc, the third embodiment disengages the clutch 10 (T1n>Tc in FIG. 13). If the estimated clutch temperature T1n decreases to the automatic mode temperature $T_A$, the third embodiment changes the protective clutch control mode to the normal automatic clutch control mode.

If the protective clutch control mode is being executed and if the estimated clutch temperature T1n decreases to the automatic mode temperature $T_A$ lower than the clutch protection temperature Tp, then the third embodiment starts the automatic clutch control mode. The timing of starting the automatic clutch control mode is proper because the protective clutch control mode will not be resumed quickly due to the difference between $T_A$ and Tp. The third embodiment secures the automatic clutch control mode when the estimated clutch temperature T1n is below the clutch protection temperature Tp.

Other Embodiments

The electronic control clutch 10 of any one of the first to third embodiments achieves front-rear wheels torque distribution based on front-wheel drive. The present invention is also applicable to an electronic control clutch achieving front-rear wheels torque distribution based on rear-wheel drive. The present invention is also applicable to electronic control clutches arranged for front and rear wheel driving systems, respectively. The present invention is also applicable to an electronic control differential limit clutch arranged between left and right driving wheels.

Although the electronic control clutch 10 of any one of the first to third embodiments employs a control clutch operated by an electromagnetic solenoid and a main clutch to be engaged by torque amplified by a cam mechanism, the present invention is also applicable to a hydraulically controlled multiple disk clutch disclosed in, for example, Japanese Unexamined Patent Publication No. 04-103433.

Although the present invention terminates clutch temperature estimation if a vehicle speed is greater than an estimation limit speed and restores an initial state, the present invention may employ timer management that terminates clutch temperature estimation and restores an initial state after a timer counts a set time.

Although the first to third embodiments employ the fixed increase/decrease threshold $E_0$, the present invention may employ a high increase/decrease threshold in a low-temperature atmosphere that promotes heat radiation. In this way, the present invention may employ an increase/decrease threshold variable according to an ambient temperature provided by, for example, an ambient temperature sensor. In addition, the present invention may employ an initial temperature variable depending on an ambient temperature.

Although the second embodiment employs the minimum speed difference ΔVmin, the present invention may zero a wheel speed provided by a wheel speed sensor attached to a wheel if the wheel speed is below a detection limit of the wheel speed sensor, to achieve the same effect as the second embodiment.

This application claims benefit of priority under 35USC §119 to Japanese Patent Applications No. 2000-282896, filed on Sep. 19, 2000, No. 2001-21320, filed on Jan. 30, 2001, and No. 2001-021321, filed on Jan. 30, 2001, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An apparatus for estimating the temperature of a driving clutch whose engagement including slide engagement is controllable, comprising:

a clutch speed difference detector detecting a rotational speed difference between input and output shafts of the driving clutch;

a torque estimator estimating torque transmitted through the driving clutch;

an energy calculator calculating energy applied to the driving clutch according to the detected rotational speed difference and estimated torque;

a temperature estimator estimating a clutch temperature variation based on the calculated energy and estimating a clutch temperature based on the estimated clutch temperature variation; and a determination unit determining whether or not the calculated energy is equal to or above a reference energy level, wherein if the calculated energy is determined to be equal to or above the reference energy level, the temperature estimator increases the estimated clutch temperature by an increment, and if the calculated energy is determined to be below the reference energy level, the temperature estimator decreases the estimated clutch temperature by a decrement.

2. The apparatus of claim 1, wherein the reference energy level corresponds to an energy level at which the driving clutch substantially maintains a constant temperature.

3. The apparatus of claim 1, wherein the increment is set in proportion to a difference between the calculated energy and the reference energy level, and the decrement is set to a predetermined value.

4. The apparatus of claim 1, further comprising:

a temperature gradient setter setting a temperature incremental gradient gentler than an actual temperature incremental gradient and a temperature decremental gradient steeper than an actual temperature decremental gradient if the estimated clutch temperature is within a practical driving temperature domain, and a temperature incremental gradient steeper than an actual temperature incremental gradient and a temperature decremental gradient gentler than an actual temperature decremental gradient if the estimated clutch temperature is in a high-load temperature domain, the set temperature incremental gradient being used to determine the increment, the set temperature decremental gradient being used to determine the decrement.

5. The apparatus of claim 1, further comprising:

a vehicle speed detector detecting a vehicle speed; and an estimation terminator, wherein:

if the detected vehicle speed is equal to or above a reference speed, the estimation terminator terminates the temperature estimator estimating a clutch temperature and restores an initial state.

6. The apparatus of claim 1, further comprising a clutch controller, wherein:

the driving clutch is arranged to distribute engine torque among front and rear wheels and the estimated clutch temperature is used as data to start protective clutch control to prevent the overheating of the driving clutch; and the clutch controller operates to decrease the temperature of the driving clutch if the estimated clutch temperature is equal to or above a clutch protection temperature.

7. The apparatus of claim 6, wherein:

the clutch controller sets a clutch limit temperature higher than the clutch protection temperature; and the clutch controller enhances the engagement of the driving clutch if the estimated clutch temperature is equal to or above the clutch protection temperature and disengages the driving clutch if the estimated clutch temperature is equal to or above the clutch limit temperature.

8. The apparatus of claim 7, wherein:

normal clutch control is carried out until the estimated clutch temperature reaches the clutch protection temperature and a normal control temperature lower than the clutch protection temperature is set for the normal clutch control; and the apparatus further comprises a normal clutch control resumption mechanism, the apparatus enhancing the engagement of the driving clutch if the estimated clutch temperature is equal to or above the clutch protection temperature, disengaging the driving clutch if the estimated clutch temperature is equal to or above the clutch limit temperature, and switching the protective clutch control to the normal clutch control if the estimated clutch temperature is equal to or below the normal control temperature.

9. The apparatus of claim 8, wherein:

the clutch speed difference detector detects the rotational speed difference between the input and output shafts of the driving clutch according to a difference between an average of front wheel speeds provided by left and right wheel speed sensors and an average of rear wheel speeds provided by left and right rear wheel speed sensors; and the energy calculator compares the detected rotational speed difference with a minimum difference set according to a detection limit of the wheel speed sensors, calculates energy applied to the driving clutch according to the detected rotational speed difference if the detected rotational speed difference is above the minimum difference, and calculates energy applied to the driving clutch by zeroing the detected rotational speed difference if the detected rotational speed difference is equal to or below the minimum difference.

10. An apparatus for estimating the temperature of a driving clutch whose engagement including slide engagement is controllable, comprising:

clutch speed difference detecting means for detecting a rotational speed difference between input and output shafts of the driving clutch;

torque estimating means for estimating torque transmitted through the driving clutch;

energy calculating means for calculating energy applied to the driving clutch according to the detected rotational speed difference and estimated torque;

temperature estimating means for estimating a clutch temperature variation based on the calculated energy and estimating a clutch temperature based on the estimated clutch temperature variation; and determining means for determining whether or not the calculated energy is equal to or above a reference energy level, wherein if the calculated energy is determined to be equal to or above the reference energy level, the temperature estimating means increases the estimated clutch temperature by an increment, and if the calculated energy is determined to be below the reference energy level, the temperature estimating means decreases the estimated clutch temperature by a decrement.

11. A method of estimating the temperature of a driving clutch whose engagement including slide engagement is controllable, comprising:

detecting a rotational speed difference between input and output shafts of the driving clutch;

estimating torque transmitted through the driving clutch;

calculating energy applied to the driving clutch according to the detected rotational speed difference and estimated torque;

estimating a clutch temperature variation based on the calculated energy and estimating a clutch temperature based on the estimated clutch temperature variation; and determining whether or not the calculated energy is equal to or above a reference energy level, wherein if the calculated energy is determined to be equal to or above the reference energy level, the clutch temperature estimating operation increases the estimated clutch temperature by an increment, and if the calculated energy is determined to be below the reference energy level, the clutch temperature estimating operation decreases the estimated clutch temperature by a decrement.

12. The method of claim 11, wherein the reference energy level corresponds to an energy level at which the driving clutch substantially maintains a constant temperature.

13. The method of claim 11, wherein the clutch temperature estimating operation sets a temperature incremental gradient gentler than an actual temperature incremental gradient and a temperature decremental gradient steeper than an actual temperature decremental gradient if the estimated clutch temperature is within a practical driving temperature domain, and a temperature incremental gradient steeper than an actual temperature incremental gradient and a temperature decremental gradient gentler than an actual temperature decremental gradient if the estimated clutch temperature is in a high-load temperature domain, the set temperature incremental gradient being used to determine the increment, the set temperature decremental gradient being used to determine the decrement.

* * * * *